(12) United States Patent
Denteneer et al.

(10) Patent No.: US 7,251,251 B2
(45) Date of Patent: Jul. 31, 2007

(54) METHOD OF AND SYSTEM FOR TRANSMITTING A PLURALITY OF MESSAGES

(75) Inventors: Theodorus Jacobs Johannes Denteneer, Eindoven (NL); Ewa Barbara Hekstra-Nowacka, Eindhoven (NL); Serverius Petrus Paulus Pronk, Eindhoven (NL); Ludovicus Marinus Gerardus Maria Tolhuizen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1053 days.

(21) Appl. No.: 10/266,302

(22) Filed: Oct. 8, 2002

(65) Prior Publication Data

US 2003/0091060 A1 May 15, 2003

(30) Foreign Application Priority Data

Oct. 12, 2001 (EP) .................................. 01203906

(51) Int. Cl.
*H04J 3/02* (2006.01)
*H04L 12/413* (2006.01)

(52) U.S. Cl. ...................................... 370/447; 370/462
(58) Field of Classification Search ................ 370/462, 370/445, 461, 458, 443, 444, 442, 347, 348
See application file for complete search history.

(56) References Cited

U.S. PATENT DOCUMENTS 5,390,181 A 2/1995 Campbell et al. .......... 370/85.2
5,734,833 A 3/1998 Chiu et al. .............. 395/200.55
5,960,000 A 9/1999 Ruszczyk et al. ........... 370/447
6,181,687 B1 * 1/2001 Bisdikian ..................... 370/347

OTHER PUBLICATIONS

Sala et al: "Comparison of contention resolution algorithms for a cable modem MAC protocol" Broadband Communications, 1998. Accessing, Transmission, Networking. Proceedings. 1998 International Zurich Seminar. Feb. 17, 1998, pp. 83-90.
Capetanakis: "Contention Resolving Tree Algorithms For Multiple Access Channels" International Conference On communications. IEEE, vol. 2, Jun. 1979, pp. 24601-24605.
Boxma et al: Some models for contention resolution in cable networks Eurandom Report 037-2001, 'Online! 2001, pp. 1-16.

* cited by examiner

*Primary Examiner*—Chau Nguyen
*Assistant Examiner*—Farah Faroul

(57) ABSTRACT

A method and system of transmitting messages include requesting to submit a first request for transmitting a first message and to submit a second request for transmitting a second message until there is no first collision detected between the submitted first and second requests upon receipt of the submitted first and second requests. Before there is no first collision detected between the submitted first and second requests, it is requested to submit a third request for transmitting a third message and to submit a fourth request for transmitting a fourth message. However, requesting to re-submit the third request for transmitting the third message and to re-submit the fourth request for transmitting the fourth message if a second collision is detected between the submitted third and the second requests upon receipt thereof is delayed until there is no first collision detected between the submitted first and second requests.

10 Claims, 4 Drawing Sheets

METHOD OF AND SYSTEM FOR TRANSMITTING A PLURALITY OF MESSAGES

The invention relates to a method of transmitting a plurality of messages, the plurality of messages being transmitted over a communication channel, the method comprising:

requesting to submit a first request for transmitting a first message of the plurality of messages and to submit a second request for transmitting a second message of the plurality of messages until detecting no first collision between the submitted first request and the submitted second request upon receipt of the submitted first and second request.

Further, the invention relates to a system to transmit a plurality of messages, the plurality of messages being transmitted over a communication channel, the system comprising:

first requesting means conceived to request to submit a first request for transmitting a first message of the plurality of messages and to submit a second request for transmitting a second message of the plurality of messages until detecting no first collision between the submitted first request and the submitted second request upon receipt of the submitted first and second request.

An embodiment of the method, and system as set forth above is known from U.S. Pat. No. 6,181,687. Here, a communication system is disclosed where tree-search or stack contention-resolution algorithms in hybrid Medium Access Control (MAC) protocols are used by Cable Television stations (CaTV) to resolve message transmission collisions.

The CaTV broadband data network provides two-way communication between subscriber computer systems and the CaTV head-end (H/E). From there, the two-way communications continue to the rest of the digital data network to which the CaTV is connected. Subscriber computer systems are connected to the CaTV H/E via a device called the cable modem, which can be located internally or externally with respect to the subscriber computer system. The cable modem connects to the H/E via the same CaTV cable used for regular analog TV viewing. Data transmissions from the cable modems to the H/E are usually referred to as the upstream transmissions and they occupy a plurality of frequency bands. Each such frequency band is also referred to as an upstream or return channel. Data transmissions from the H/E to the cable modems are usually referred to as the downstream transmissions and they too occupy a plurality of, different, frequency bands. Each such frequency band is referred to as a downstream channel.

The network topology and architecture of a CaTV system does not allow for subscribers' cable modems to listen to each other's transmissions. Thus, the possibility exists that two or more messages transmitted by different cable modems overlap in time and frequency with each other resulting in destruction of the information that these messages carry. To resolve these message transmission collisions, non-overlapping transmission time intervals of variable duration are generated by the H/E and grouped into clusters of varying number of time intervals and varying time distances between them. Sequences of clusters are formed in which any station transmitting in a particular cluster will learn of the status of its message transmissions before commencement of the next cluster. Collision resolution is performed collectively on all message transmissions in a cluster and along the successive clusters of the same sequence. However, the variance of the waiting time to complete the collision resolution is an important quality characteristic that influences the quality of service experienced by the user.

It is an object of the invention to provide a method that reduces the variance of the waiting time in contention resolution. To achieve this object, the method according to the preamble is characterized in that the method further comprises:

requesting to submit a third request for transmitting a third message of the plurality of messages and to submit a fourth request for transmitting a fourth message of the plurality of messages before detecting no first collision between the submitted first request and the submitted second request;

delaying requesting to re-submit the third request for transmitting the third message and to re-submit the fourth request for transmitting the fourth message if a second collision is detected between the submitted third request and the submitted second request upon receipt of the submitted third and second request until detecting no first collision between the submitted first request and the submitted second request.

By starting to resolve a second collision before a first collision is resolved and postponing the actual resolution of the second collision until the first collision has been resolved, the variance of the waiting time in contention resolution of the messages sent by multi-media stations is reduced. The waiting time in contention resolution is reduced because the sequence with which the collisions are being resolved is controlled to approximate a first come first served resolution.

An embodiment of the method according to the invention is described in claim 2. By using contention trees to resolve the collisions, the contention resolution algorithm has a defined start that is initiated by a head-end station that controls the contention resolution. It also has a defined end at which all contentions between the messages present at the start have been resolved and the head-end station knows the occurrence of this end.

An embodiment of the method according to the invention is described in claim 3. Because a head-end station initiates the start of a contention tree, the multi-media stations that have messages to send can be unaware of the time that they become active. When a multi-media station becomes active, it waits until sending its request for slots to put in the data it wants to communicate until it receives the appropriate request slot of the head-end station.

An embodiment of the method according to the invention is described in claim 4. By tracking the length of the contention trees that have resolved collisions of messages, the number of contention trees that can be started and have not been resolved is determined. Preferably, the square of the number s of contention trees that are started equals the average length L of the contention trees that have resolved collisions of messages divided by 6:

$$s^2 = \frac{L}{6}$$

An embodiment of the method according to the invention is described in claim 5. The data that is being send over the communication channel is comprised within slots. The slots themselves are grouped into frames. By initiating a new contention tree depending upon the number of frames ago that a previous contention tree has been started, the average length of the contention trees can be controlled and thus the variance of the waiting time of contention resolution is controlled and reduced.

It is a further object of the invention to provide a system that that reduces the variance of the waiting time in contention resolution. To achieve this object, the system according to the preamble is characterized in that the system further comprises:

second requesting means conceived to request to submit a third request for transmitting a third message of the plurality of messages and to submit a fourth request for transmitting a fourth message of the plurality of messages before detecting no first collision between the submitted first request and the submitted second request;

delaying means conceived to delay requesting to re-submit the third request for transmitting the third message and to re-submit the fourth request for transmitting the fourth message if a second collision is detected between the submitted third request and the submitted second request upon receipt of the submitted third and second request until detecting no first collision between the submitted first request and the submitted second request.

An embodiment of the system according to the invention is described in claim 7.

The invention will be described by means of embodiments illustrated by the following drawings.

Figure 1:
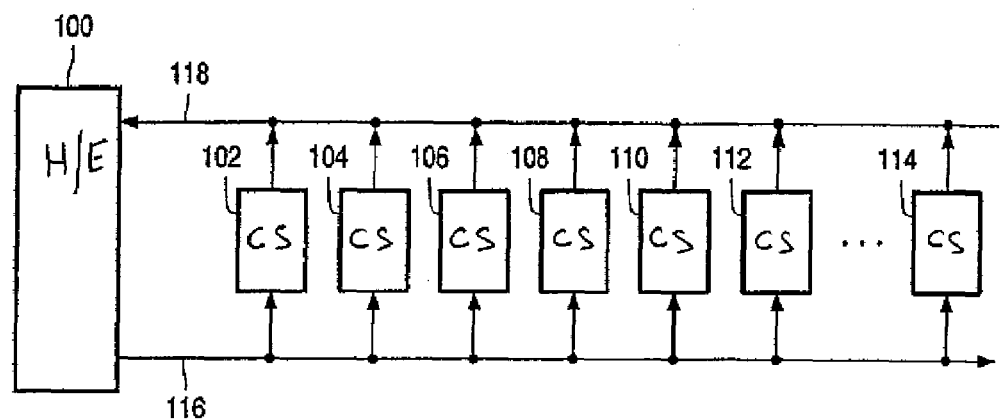
FIG. 1 illustrates a cable TV broadband network configuration.

FIG. 1 illustrates a cable TV broadband network configuration. The Head-End (H/E), 100 is connected to the cable stations (CSs) 102 to 114 via a downstream communication channel 116 and an upstream communication channel 118. Each cable station (CSs) 102 to 114 is physically connected to the digital communication channels via its cable modem (not shown). The cable modems perform the actual transmission of data. Thus when it is described that a cable station (CSs) sends and receives data, the cable modem performs this transmission. The cable modem connects to the H/E 100 via the same CaTV cable used for regular analog TV viewing. Data transmissions from the cable stations (CSs) 102 to 114 to the H/E 100 occupy a plurality of frequency bands. Each such frequency band is referred to as an upstream or return communication channel 118. Data transmissions from the H/E 100 to the cable stations (CSs) 102 to 114 occupy a plurality of, different, frequency bands. Each such frequency band is referred to as a downstream communication channel 116. The upstream communication channel 118 is time slotted and shared among the cable stations (CSs) 102 to 114, so that the messages being sent from the cable stations (CSs) 102 to 114 can collide. Therefore, contention resolution is needed for upstream data transport. A way to carry out the upstream data transport is via a request-grant mechanism as described within Digital Video Broadcasting (DVB); DVB interaction channel for Cable TV distribution systems (CATV), working draft (Version 3), Jun. 28, 2000, based on European Telecommunication Standard 300 800 (March 1998). Within this request-grant mechanism, cable stations (CSs) request data slots in contention with other stations (CSs) and data transfer follows after a successful request in reserved slots not in contention with other stations. (CSs). Data transfer can thus be organized efficiently via a sequential procedure in which bandwidth is requested by the cable stations (CSs) via a contention resolution procedure and bandwidth is granted to the stations (CSs) after successful contention and a queuing procedure.

A standard approach to scheduling for data transfer in cable networks requires a, so called, bandwidth divisor, which allocates a part of each frame to the two processes mentioned above: requests and actual data transfer. Thus, each frame consists of f slots, and the bandwidth divisor will allocate $t_n$ of the slots of frame n to the contention resolution procedure and $d_n$ to the actual data transfer. Here, $0 \leq t_n \leq f$ and $0 \leq d_n \leq f$ and $d_n + t_n = f$ for all n.

Figure 2:
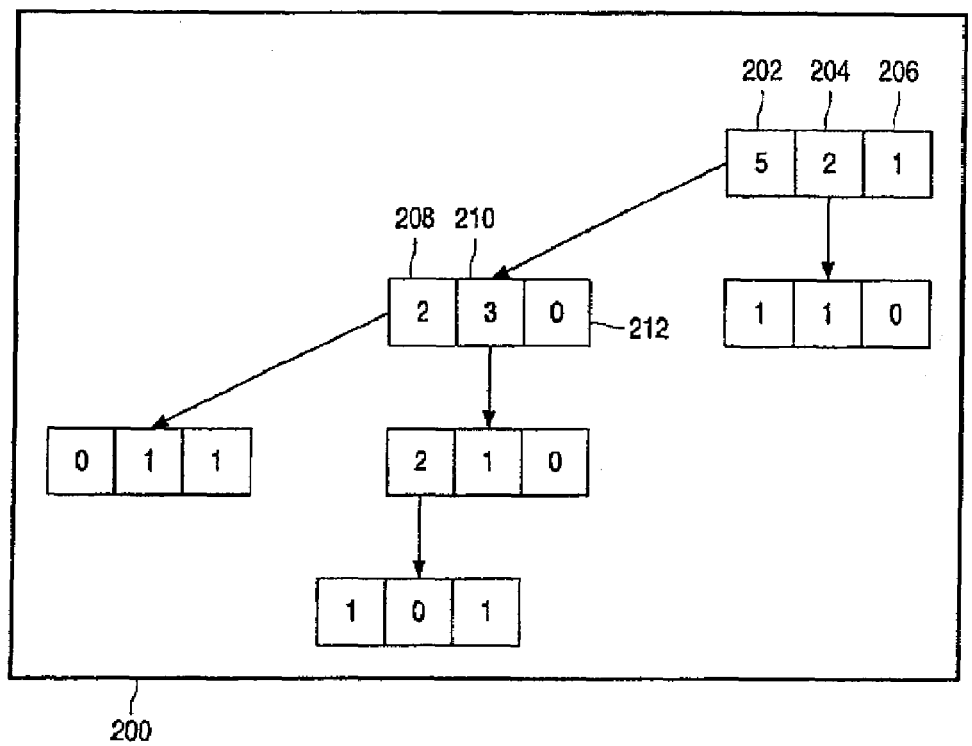
FIG. 2 illustrates a contention resolution procedure making use of contention trees.

FIG. 2 illustrates a contention resolution procedure making use of contention trees. Resolving contention between the requests of cable modems via contention trees is well known. By means of example, a ternary contention tree 200 is described. The head-end provides the cable stations that have data to sent with three slots 202, 204, and 206. Each cable station chooses a slot to send its request. In the described example, there are 8 cable stations, or contenders and 5 stations send their request in slot 202, 2 stations send their request in slot 204, and 1 station sends its request in slot 206. The cable stations are not aware of the choices the other stations make. Upon receipt of the slots by the head-end, the head-end must resolve the contention within slot 202 and 204, since the head-end is unable to derive which request belongs to which cable station. There's no need to resolve contention within slot 206, because only one cable station has transmitted its request in this slot thus the head-end is able to grant the request within slot 206.

In order to resolve the contention within slot 202, the head-end provides slots 208, 210, and 212 within the next frame and requests each station that has transmitted a request in slot 202 to re-transmit their request within one of the slots 208, 210 and 212. The appropriate cable stations then choose again one of the slots 208, 210 and 212 to transmit their request. Upon receipt of these slots 208, 210, and 212, the head-end can not grant any message, thus the head-end has to send again new slots in the next frame as illustrated within FIG. 2, until each slot comprises the request for exactly one cable station.

During the resolution of the described contention tree, other cable stations might have become active, i.e. have requests for bandwidth to be granted for data transfer. These requests are captured in a, so-called, root node of a next contention tree after the previous contention tree has been resolved.

Figure 3:
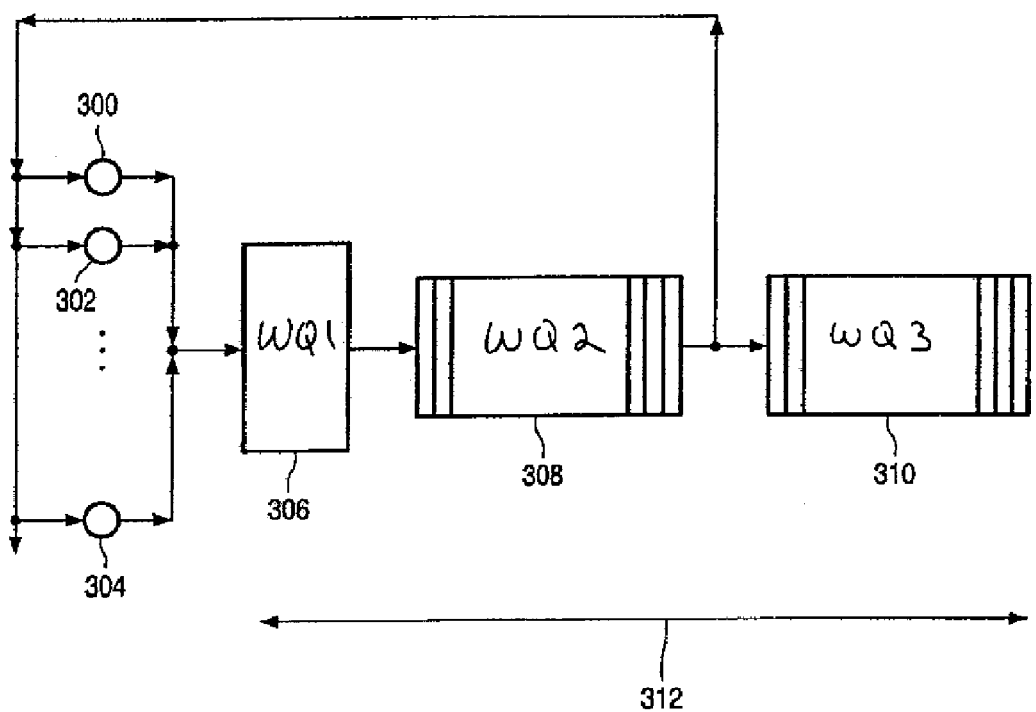
FIG. 3 illustrates time spent until data transfer in cable networks.

FIG. 3 illustrates time spent until data transfer in cable networks. The upstream data that is transmitted from the cable stations to other cable stations via the head-end usually results from user interaction with the cable station. For example, in case of a television set, users can vote for their favorite artist during a song festival or the like. The response of the television set is then determined by the time required to transmit the data from the television set to the head-end. Further, in order to improve the response-speed and homogeneous quality of service to the users of the cable station, a low variance is needed of the waiting time until data is transmitted. This total waiting time 312 can be divided over:

a waiting queue (WQ1) 306, in which the cable stations 300 to 304 have to wait virtually before their request is being captured within a tree node;

a waiting queue (WQ2) 308, in which the cable stations 300 to 304 have to wait virtually after their request is captured and until their contention has been resolved; and a waiting queue (WQ3) 310, in which the cable stations 300 to 304 have to wait virtually after their contention is resolved and until their data is transmitted.

The waiting time during the queues 306 and 308 is referred to as the waiting time during contention resolution, whereas the waiting time during the queue 310 is referred to as the waiting time during data transmission. A low variance of the waiting time during contention resolution has a positive effect upon the average waiting time during data transmission. Since the queue 310 can be modeled by means of an M/G/1 queue, the service time of a station that enters this queue is equal to the number of packets requested by that station. Now a cable station that is active in the contention resolution procedure can update its request if it receives new packets to transmit and it has not yet been successful in the contention procedure. Consequently, the number of packets that a cable station will request depends on the time spent in the contention resolution and thus the variance of the number of packets requested will depend on the variance of the time spent in contention resolution.

As illustrated in FIG. 1, the time spent in contention resolution consists of two parts: the time until the next contention tree is started and the time spent in this contention tree. If the contention resolution is organized, so that a new tree is started as soon as the previous tree is finished, the time spent before contention and the time spent in contention are uncorrelated. Furthermore, the variance of the total waiting time of a random cable station is to the first order proportional to the square of the number of active cable stations:

$$\text{var}(S) \approx (N - \mu/\lambda)^2/6 + (4N - 2\mu/\lambda)/3\left(\frac{1}{\mu}\right)^2 \quad (1)$$

Here S denotes the waiting time of a random station; N is the number of stations in the system that is currently active; $\lambda$ is intensity with which each station generates data packets, and $\mu$ is the rate at which stations are successful and leave the contention resolution. In case $t_n=1$ for all n, so that there is exactly one slot devoted to the tree process, there are on average log(3) successful exits per frame. So that in this case $\mu=\log(3)$. As the number of active stations can be quite large, the variance of the waiting time can become large too.

This is especially so when this variance is offset against the variance of the waiting time in contention resolution in a schedule in which the contention procedure serves the cable stations "first come first served". In the latter service order, the procedure of the contention tree is so organized that the stations that have spent most time waiting before contention resolution are served first during the contention resolution procedure. Thus, the two parts of the waiting time are negatively correlated, and lower variance results:

$$\text{var}(S) \approx (N-\mu/\lambda)(1/\mu)^2+(\mu/\lambda)(1/\mu)^2=N/\mu^2. \quad (2)$$

So in this case the variance is proportional to the number of active stations, rather than the square of the number of active stations. Given the importance of the variance of the waiting time in contention resolution, it is better to schedule the contending cable stations "first come first served". In this case, the first cable station to become active during the execution of the previous tree, will be the first to be successful in the current tree.

Figure 4:
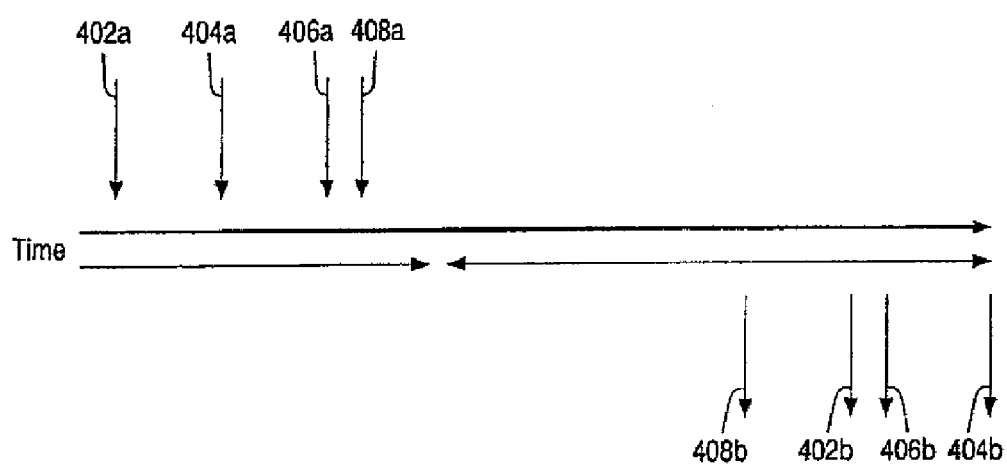
FIG. 4 illustrates a sequence of contention resolution via contention trees between cable stations.

FIG. 4 illustrates a sequence of contention resolution via contention trees between cable stations. The time indicated by the arrow $402_a$, indicates the time at which cable station 102, see FIG. 1, becomes active and enters the waiting queue before contention resolution. The times indicated by the arrows $404_a$, $406_a$, and $408_a$ indicate the times at which respective cable stations 104, 106, and 108, see FIG. 1, become active and thus enter the waiting queue before contention resolution. However, it is not possible serving the cable stations "first come first serve" while using contention trees. Once the stations have entered a contention tree it is hard to find a mechanism to utilize the order in which the stations became active. This is illustrated by the arrows $402_b$, $404_b$, $406_b$, and $408_b$ that indicate the times at which respective cable stations 102, 104, 106, and 108 leave the contention tree. Thus cable station 104 that enters the waiting queue before contention resolution second can leave the contention tree resolution procedure last.

Figure 5:
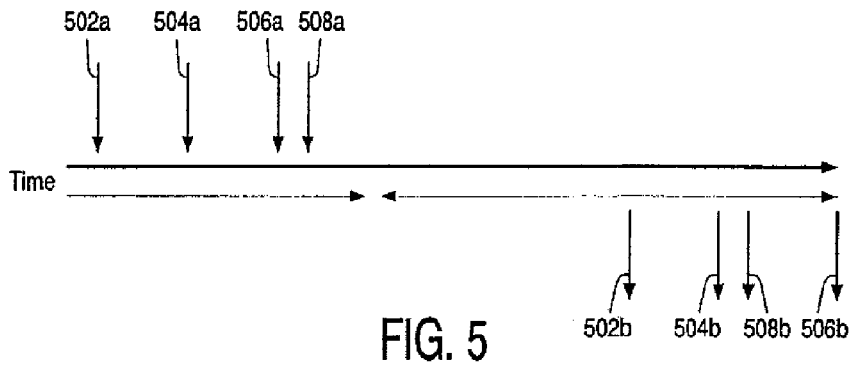
FIG. 5 illustrates a mechanism to approximate the "first come first served" schedule.

FIG. 5 illustrates a mechanism to approximate the "first come first served" schedule. The "first come first served" schedule can be approximated by using a queue of trees. These trees are served "first come first served", so that the contentions in the tree that originate first are resolved before the contentions in the trees that originate later. Moreover, stations 102 and 104 that contend in an "early" tree because they became active at respective times $502_a$ and $504_a$ before stations 106 and 108 that contend in a "later" tree because they became active at respective times $506_a$ and $508_a$. However, within a given tree, there is still no further discrimination between stations regarding the time at which they became active. Thus the stations 102 and 104 will leave the contention resolution procedure at respective times $502_b$ and $504_b$ which are before times $506_b$ and $508_b$ that denote the times that respective stations 108 and 106 leave the contention resolution procedure. Therefore, the schedule with multiple trees approximates the first come first served policy. Note, that if the contention resolution procedure of the stations 102 and 104 is resolved within one step, i.e. the requests of stations 102 and 104 do not collide, these requests are transferred to a next queue. This next queue comprises the resolved (non colliding) requests and is used to grant data slots to the corresponding requesting stations. Furthermore, a station can update its request each time it is asked to send its request again during one contention tree resolution procedure. Thus if the amount of data that a station is able to transmit increases during one contention tree resolution procedure, the station can update its request accordingly.

In a preferred mode of the proposed algorithms, they operate so that the trees in the queue will be approximately equally long. Whereby the length of a tree equals the number of slots needed to resolve a root-node of a tree until all collisions captured within the root-node are resolved. Then the variance of the waiting time during contention resolution is equal to:

$$\text{var}(S) \approx \frac{1}{6}\frac{(N-\mu/\lambda)^2}{s^2} + O(N) \quad (3)$$

Here, s is the number of trees. Using s trees to pre sort the cable stations, the variance drops from $O(N^2)$ to $O(N^2/s^2)$.

This expression also gives a rule of the thumb as to how many trees to use in the queue. Theoretically, the more trees the better. Pragmatically, it serves little purpose to make the quadratic term in (3) much smaller than the variance in (2). Thus from the requirement that $$\frac{1}{6}\frac{(N-\mu/\lambda)^2}{\mu^2 s^2} \approx \frac{N}{\mu^2} \quad (4)$$

we obtain that $$s^2 \approx \frac{N(1-\mu/\Lambda)^2}{6} \quad (5)$$
$$\approx \frac{N(1-\mu/\Lambda)}{6}$$
$$\approx L/6.$$

we obtain that

Here L is the average length of one tree, and $\Lambda=N\lambda$. Thus, by tracking the length of the trees we can adaptively estimate the "best" number of trees to use in the queue.

Figure 6:
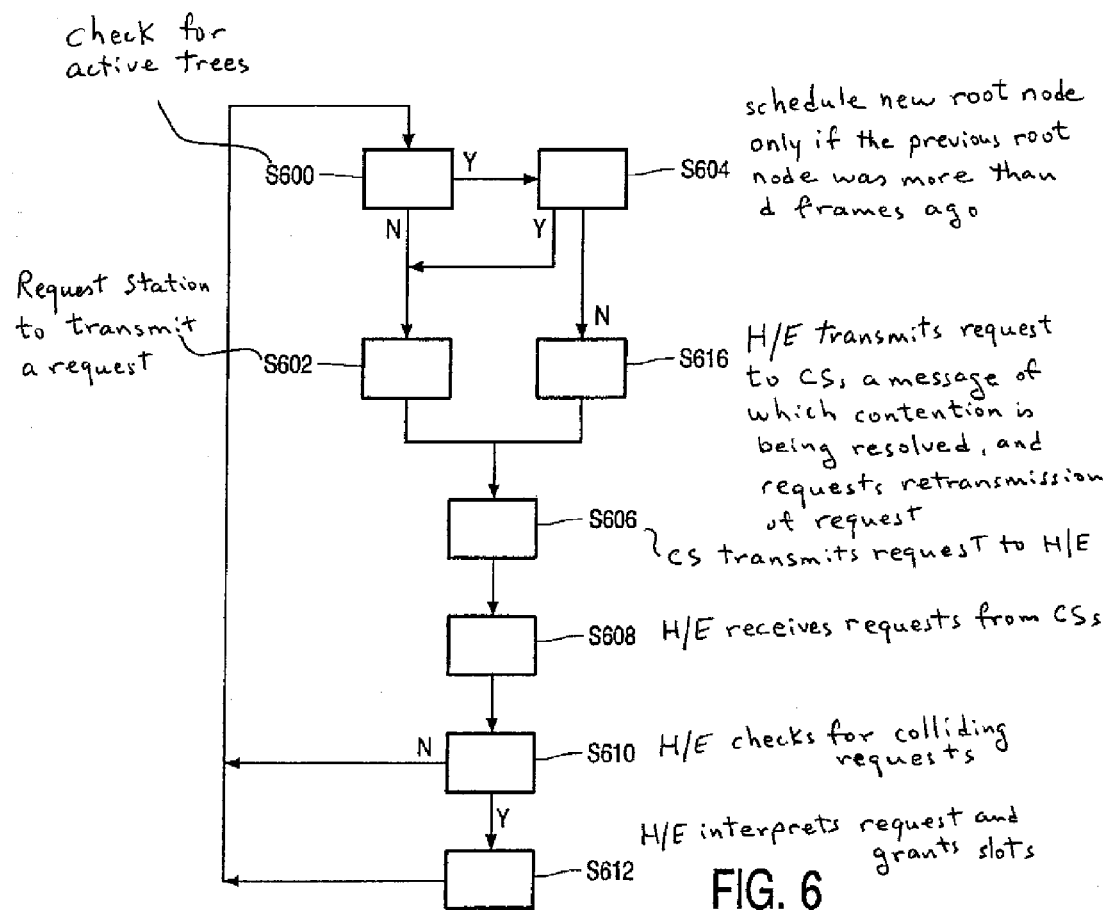
FIG. 6 illustrates the main steps of the method according to the invention.

FIG. 6 illustrates the main steps of the method according to the invention. In case the cable stations are unaware of the time of becoming active it is not possible to split the set of active cable stations on the basis of specified time intervals. In this case, root nodes of new trees are scheduled on a regular basis, possibly interrupting the execution of a current tree. Thus the root nodes "captures" those cable stations that have become active since the previous root node and starts up a new tree. However, the completion of this tree is suspended until all previously initiated trees have been completed. This is achieved by maintaining a queue of root nodes that are served in the first come first served order. The execution of a current tree is only interrupted to schedule a new root node. Within the first step S600, the head-end checks if there are active trees. An active tree is a tree that is started but has not been resolved. There are no active trees when a root node queue is empty and the current tree is completed. If there are no active trees step S602 is performed. Within step S602 a new root node is scheduled by requesting cable stations that have data to be transmitted to transmit their request within the appropriate slots $t_n$ within the next frame f. If there are active trees, step S604 is performed in stead of step S602. Within step S604 a new root node is scheduled within the next frame f only if the most recent root node was more than d frames ago and there are less than s trees active. The variable d and s can be determined according to the following situations:

fixed rate scheduling wherein d can vary and s is unspecified. Thus the number of active trees is not bounded, and a root node is scheduled each d frames;

bounded fixed rate scheduling wherein both d and s can vary. Thus, a root node is scheduled every d frames, and a queue of at most s trees is maintained within S604;

specified queue size scheduling wherein s can vary and d is unspecified.

Then, within S604, root nodes are scheduled so that the queue size approximates s–1 trees closely, but never exceeds s–1 trees. This can be achieved via an adaptively computed value of d. The following algorithm computes such a value for d, which has the additional property that the root nodes are scheduled equidistantly:

let AvgDist denote a current estimate of the average realized distance between scheduled root nodes;

let AvgQueue denote a current estimate of the average size of the queue of root nodes;

update $d:=\text{alpha}*d+(1-\text{alpha})*(1+\text{AvgQueue})*\text{AvgDist}/s$ Here, "alpha" is a real valued parameter of the procedure between 0 and 1 adaptive scheduling wherein neither s nor d are specified. In this case root nodes are scheduled via automatically chosen values of s and d. This is done by adapting s slowly and adapting d as in the previous case. In a preferred implementation, a target value for s is aimed that is defined by $$s==\sqrt{}(s*l/6), \quad (6)$$

with l a current estimate of the average tree lengths. This is achieved by adapting s slowly and set $$s:=s+\text{sign}(\lceil\sqrt{s*l/6}\rceil-s) \quad (7)$$

Then adapt d to achieve equi-spacing etc. Note that for each situation at most one root node per frame is scheduled.

If within step S604 it is determined that no new root node is to be scheduled then step S616 is performed. Within step S616, the head-end transmits a request to the cable stations that comprises a message for cable stations of which contention is currently being resolved. The head end requests each cable station that has transmitted a request within a predefined slot to transmit that request again. If within step S604 it is determined that a new root node is to be scheduled, then step S602 is performed that schedules a root node.

Both step S602 and step S616 then proceed to step S606. Within this next step S606, the cable stations receive the request from the head-end. When the cable station has data to transmit it chooses a slot from the provided slots and transmits its request for data slots to the head-end. However, when a cable station receives from the head-end a grant to transmit the requested data, the cable station transmits its data within the provided data slots $t_d$. Within step S608, the head-end receives the requests from the cable stations. Within the next step S610, the head-end checks for each slot devoted to the tree process whether there are colliding requests as previously described. When there are slots comprising one request from one station, the head-end proceeds to step S612 and interprets the request. It then grants data slots to the one station according to the request of that station after which step S600 is performed which is also performed for the colliding slots within step S610.

Basically, the tree queue is served first come first served', so that the tree that is initiated first is completed before the contentions in a later tree are resolved. In practice, this rule is slightly relaxed because of feedback delays. Recall that a tree scheduler operates in the context of a "bandwidth divisor" that allocates a given number $t_n$ of slots in the current frame n to the contention process. Due to feedback delays, it is not always possible to devote all of these $t_n$ slots to the tree at the head of the queue. Then, rather than waste the remaining slots, they are allocated to the tree that is second in the queue. This process can be repeated if not all of the remaining slots can be used for this second tree, and there are more than two trees in the queue.

Next, an example assessment of the method according to the invention is given in case the cable stations are unaware of time. All results pertain to the case $t_n=1$ and the mean tree lengths for various target values of s is presented. The simulations concern various traffic intensities L, where Λ is the total traffic intensity: Λ=Nλ and various (non-limiting) number of active stations ranging from n=100 to N=1000. The results are given in number of slots; as $t_n$=1 the results can be converted to time by dividing by the frame length f=18 and multiplying with frame time equal to 3 msec. Table 1 illustrates that scheduling s trees does indeed result in a reduction of the average tree length by a factor s. This result holds irrespective of the number of cable stations that is active and irrespective of the traffic intensity.

TABLE 1

| | N = 100 | | | N = 200 | | | N = 1000 | | |
|---|---|---|---|---|---|---|---|---|---|
| | s = | | | s = | | | s = | | |
| Λ | s = 1 | s = 5 | 10 | s = 1 | s = 5 | s = 10 | s = 1 | s = 5 | s = 10 |
| 2.5 | 77 | 12 | 6 | 155 | 24 | 11 | 780 | 116 | 55 |
| 5.0 | 89 | 16 | 8 | 179 | 32 | 16 | 900 | 159 | 76 |
| 10.0 | 90 | 18 | 9 | 181 | 36 | 17 | 909 | 177 | 81 |
| 16.5 | 91 | 19 | 9 | 181 | 37 | 18 | 908 | 182 | 89 |

Further, the tree lengths of successive trees are compared to an alternative "greedy" scheme to schedule two trees. This greedy scheme also maintains s active trees. However, the greedy scheme differs from the scheme according to the invention in two respects. Firstly, it starts up a new tree as soon as a previous tree is completed. Thus it does not attempt to distribute the start of new trees evenly over time. Secondly, the trees are served in a round robin fashion. Conversely, the scheme according to the invention allocates the tree slots to the tree that is started first. Then the scheme according to the invention is more stable than the greedy scheme because the greedy scheme alternates between very long trees and bursts of very shorts trees. The scheme according to the invention, by contrast, results in a sequence of stable tree lengths after an initial burn in period.

In another embodiment of the method according to the invention, the cable stations are aware of time. Then successive "tree rounds" are considered and in each tree round, a, variable, number of trees is executed:

L is the length of the previous tree round; it is the sum of the length of the trees executed in this previous tree round;

S is the set of cable stations that have become active in the previous tree round, i.e. that have data to transmit and that are not currently engaged in a contention. Further, it is assumed that the cable stations are aware of the instant at which they have become active relative to the start of the previous tree round. Consequently, the stations can determine whether they belong to the set of active stations that have become active in a specified interval. Now, rather than serving the set S of active stations with just one tree; S is partitioned into nsplit subsets each of which is served with a separate tree. These separate trees are executed sequentially. The partitioning of S into subsets is carried out using timing information: the length of the previous tree round is split into nsplit time intervals of equal length. Together these time intervals span the period during which the previous tree round was executed. The first subset of S consists of those cable stations that have become active during the first of these intervals. This subset is served with the first tree. The second subset consists of those cable stations that have become active during the second of these intervals; this subset is served with the second tree, etc. Here, nsplit can be preferably determined by:

$$\text{nsplit} = \max(1, \lceil \sqrt{(L/6)} \rceil) \quad (8)$$

Next, an example assessment of the method according to the invention is given in case the cable stations are unaware of time. All results comprised within Table 2, Table 3 and Table 4 pertain to the case $t_n$=1 and the variance of the waiting time in contention resolution is presented for various values of s. Further, various traffic intensities L are concerned, where Λ is the total traffic intensity: Λ=Nλ and various number of active stations ranging from n=100 to N=1000. The results are given in number of slots; as $t_n$=1 the results can be converted to time by dividing by the frame length f=18 and multiplying with frame time equal to 3 msec. Table 2 illustrates a comparison between moments of the waiting time maintaining a queue of s trees, with N=100 terminals. Table 3 illustrates a comparison between moments of the waiting time maintaining a queue of s trees, with N=200 terminals. Table 4 illustrates a comparison between moments of the waiting time maintaining a queue of s trees, with N=1000 terminals. From these tables the intended effect on the variance of the waiting time in contention resolution can be observed. There is also a minor effect on the average waiting time. This is due to the fact that splitting with respect to time saves a root node to achieve the splitting, thus making the contention resolution slightly more efficient. Note that for N=100 most of the variance reduction has been achieved for split values between s=2 and s=5; for N=200 the optimal values appears to occur around s=5, and for N=1000 the optimal values of s will be above 10.

TABLE 2

| | s = 1 | | s = 2 | | s = 5 | | s = 10 | |
|---|---|---|---|---|---|---|---|---|
| Λ | Mean | VAR | Mean | VAR | Mean | VAR | Mean | VAR |
| 2.5 | 49 | 356 | 47 | 127 | 45 | 63 | 40 | 51 |
| 5.0 | 70 | 684 | 70 | 212 | 68 | 68 | 64 | 47 |
| 10.0 | 80 | 892 | 80 | 255 | 73 | 73 | 75 | 48 |
| 16.5 | 85 | 983 | 83 | 280 | 77 | 77 | 79 | 50 |

TABLE 3

| | s = 1 | | s = 2 | | s = 5 | | s = 10 | |
|---|---|---|---|---|---|---|---|---|
| Λ | Mean | VAR | Mean | VAR | Mean | VAR | Mean | VAR |
| 2.5 | 100 | 1385 | 99 | 433 | 96 | 150 | 92 | 111 |
| 5.0 | 140 | 2731 | 141 | 775 | 138 | 198 | 135 | 119 |
| 10.0 | 161 | 3580 | 160 | 981 | 159 | 227 | 155 | 121 |
| 16.5 | 169 | 3870 | 169 | 1069 | 166 | 244 | 164 | 124 |

TABLE 4

| | s = 1 | | s = 2 | | s = 5 | | s = 10 | |
|---|---|---|---|---|---|---|---|---|
| Λ | Mean | VAR | Mean | VAR | Mean | VAR | Mean | VAR |
| 2.5 | 507 | 34000 | 510 | 9500 | 505 | 2086 | 500 | 987 |
| 5.0 | 708 | 68000 | 708 | 18100 | 706 | 3480 | 702 | 1341 |
| 10.0 | 810 | 89600 | 806 | 23900 | 805 | 4630 | 803 | 1810 |
| 16.5 | 846 | 96700 | 847 | 26000 | 646 | 5000 | 842 | 1900 |

The described embodiments of the method according to the invention operate with a bandwidth divisor. However, they can also operate with a schedule in which a minimum number of slots for the request process is used, while the rest is used for data transfer of already granted packets, and finally the remainder (if any) is used again for the request process.

The described embodiments of the method according to the invention apply more generally than to contention trees only. In fact, they apply in case the contention resolution procedure is organized via a contention procedure, which satisfies the following criteria:

have a well defined start initiated by the head-end;

have a well defined end, at which all contentions between contenders present at the start have been resolved; and the occurrence of this end is known to the head-end with certainty.

An example of such a procedure is frame based ALOHA. The ALOHA system is a protocol for exchanging messages within a multi user communication system wherein the communication systems become active independently from each other and try to communicate over one channel.

The order in the described embodiment of the method of the current invention is not mandatory, a person skilled in the art may change the order of steps or perform steps concurrently using threading models, multi-processor systems or multiple processes without departing from the concept as intended by the invention.

Figure 7:
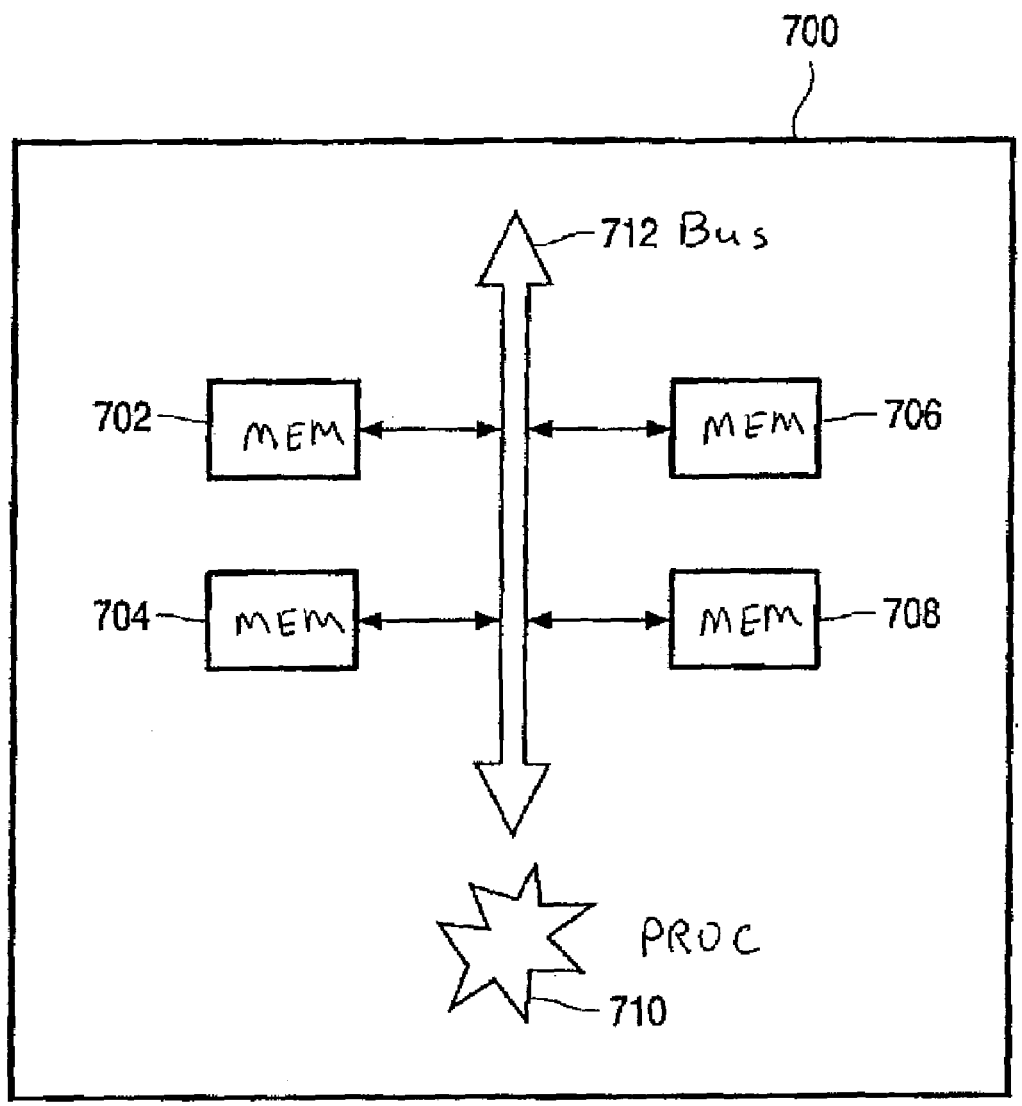
FIG. 7 illustrates the main elements of the system according to the invention in a schematic way.

FIG. 7 illustrates the main elements of the system according to the invention in a schematic way. The system 700 comprises memories (MEMs) 702, 704, 706, 708 and processor (PROC) 710 that is communicatively connected to mentioned memories through communication BUS 712. The memory (MEM) 702 comprises compiled software that is programmed to request stations that have messages to transmit to submit their requests. After these requests have been received and a collision has been detected between these requests, memory (MEM) 704 is activated. This memory comprises compiled software that is programmed to determine whether or not to request new stations that have become active to submit their new requests as previously described. Then control is passed back to memory 702, If there's no collision detected within memory (MEM) 702, control is passed to memory 704. Here, it is checked if there was another contention tree started while resolving the first collision. If there was another contention tree started, this is being resolved by passing control again to memory (MEN) 702. Memory (MEM) 706 comprised compiled software that is programmed to determine the average length of resolved contention trees. During resolving a contention tree, control is passed to memory (MEW 706, where the length of the current contention tree that has been resolved is registered and averaged with the average length of already resolved contention trees. Memory (MEM) 708 comprises the average length upon which to start a new contention tree as previously described.

The invention claimed is:

1. A method of transmitting a plurality of messages, the plurality of messages being transmitted over a communication channel, the method comprising:

requesting to submit a first request for transmitting a first message of the plurality of messages and to submit a second request for transmitting a second message of the plurality of messages until detecting no first collision between the submitted first request and the submitted second request upon receipt of the submitted first and second requests;

requesting to submit a third request for transmitting a third message of the plurality of messages and to submit a fourth request for transmitting a fourth message of the plurality of messages before detecting no first collision between the submitted first request and the submitted second request; and delaying requesting to re-submit the third request for transmitting the third message and to re-submit the fourth request for transmitting the fourth message if a second collision is detected between the submitted third request and the submitted second request upon receipt of the submitted third and second request until detecting no first collision between the submitted first request and the submitted second request.

2. The method of claim 1, wherein the first collision between the first and second request is resolved within a first contention tree and the second collision between the third and fourth request is resolved within a second contention tree.

3. The method claim 2, wherein the second contention tree is started before the first contention tree has been resolved and resolving the second contention tree is delayed until the first contention tree has been resolved.

4. The method claim 2, further comprising:

determining an average length of a plurality of resolved contention trees that have resolved respective collisions of the plurality of collisions; and starting the second contention tree depending upon the average length.

5. The method claim 4, wherein starting the second contention tree further depends upon a start of the first contention tree.

6. A system to transmit a plurality of messages, the plurality of messages being transmitted over a communication channel, the system comprising:

first requesting means conceived to request to submit a first request for transmitting a first message of the plurality of messages and to submit a second request for transmitting a second message of the plurality of messages until there is no first collision detected between the submitted first request and the submitted second request upon receipt of the submitted first and second request;

second requesting means conceived to request to submit a third request for transmitting a third message of the plurality of messages and to submit a fourth request for transmitting a fourth message of the plurality of messages before there is no first collision detected between the submitted first request and the submitted second request; and delaying means conceived to delay requesting to re-submit the third request for transmitting the third message and to re-submit the fourth request for transmitting the fourth message if a second collision is detected between the submitted third request and the submitted second request upon receipt of the submitted third and second requests until there is no first collision detected between the submitted first request and the submitted second request.

7. The system to transmit a plurality of messages according to claim 6, the system further comprising:

determination means conceived to determine an average length of a plurality of resolved contention trees that have resolved respective collisions of the plurality of collisions; and starting means conceived to start the second contention tree depending upon the average length.

8. A head-end computer for connection to multi-media stations through a communication channel the head-end computer comprising:

first requesting means conceived to request to submit a first request for transmitting a first message of the plurality of messages and to submit a second request for transmitting a second message of the plurality of messages until there is no first collision detected between the submitted first request and the submitted second request upon receipt of the submitted first and second request;

second requesting means conceived to request to submit a third request for transmitting a third message of the plurality of messages and to submit a fourth request for transmitting a fourth message of the plurality of messages before there is no first collision detected between the submitted first request and the submitted second request; and delaying means conceived to delay requesting to re-submit the third request for transmitting the third message and to re-submit the fourth request for transmitting the fourth message if a second collision is detected between the submitted third request and the submitted second request upon receipt of the submitted third and second requests until there is no first collision detected between the submitted first request and the submitted second request.

9. The head-end computer according to claim 8, wherein a set-top box is one of the multi-media stations.

10. The head-end computer according to claim 8, wherein a television set is one of the multi-media stations.

* * * * *